United States Patent
Ripley

(10) Patent No.: US 9,639,535 B1
(45) Date of Patent: May 2, 2017

(54) WASTE IDENTIFICATION SYSTEMS AND METHODS

(71) Applicant: Waste Repurposing International, Inc., Austin, TX (US)

(72) Inventor: Christopher Barnard Ripley, Lichtfield, CT (US)

(73) Assignee: Waste Repurposing International, Inc., Austin, TX (US)

( * ) Notice: Subject to any disclaimer, the term of this patent is extended or adjusted under 35 U.S.C. 154(b) by 0 days.

(21) Appl. No.: 15/092,598

(22) Filed: Apr. 6, 2016

Related U.S. Application Data

(63) Continuation-in-part of application No. 14/971,718, filed on Dec. 16, 2015.

(51) Int. Cl.
| G06F 17/30 | (2006.01) |
| G06K 9/62 | (2006.01) |
| B65G 43/08 | (2006.01) |
| G05B 15/02 | (2006.01) |

(52) U.S. Cl.
CPC ....... *G06F 17/30047* (2013.01); *B65G 43/08* (2013.01); *G05B 15/02* (2013.01); *G06F 17/30244* (2013.01); *G06F 17/30247* (2013.01); *G06F 17/30253* (2013.01); *G06F 17/30259* (2013.01); *G06K 9/627* (2013.01); *G06K 9/6263* (2013.01); *B07C 2501/0054* (2013.01)

(58) Field of Classification Search
CPC .... G06K 9/62; G06F 17/30047; B07C 5/3412
See application file for complete search history.

(56) References Cited

U.S. PATENT DOCUMENTS

| 5,447,017 | A | 9/1995 | Becher et al. | |
| 7,416,142 | B2 * | 8/2008 | Baker | B07C 5/122 |
| | | | | 100/225 |
| 7,501,951 | B2 | 3/2009 | Maruca et al. | |
| 7,564,943 | B2 * | 7/2009 | Sommer, Jr. | G01N 23/06 |
| | | | | 250/390.04 |
| 8,459,461 | B2 | 6/2013 | Borowski et al. | |
| 9,120,131 | B2 * | 9/2015 | Sundholm | B07C 5/3412 |
| 9,306,897 | B2 * | 4/2016 | Luna | H04L 51/32 |
| 9,381,546 | B2 * | 7/2016 | Miyasaka | B29B 17/02 |
| 9,405,992 | B2 * | 8/2016 | Badholm | B07C 5/3412 |
| 2007/0132842 | A1 | 6/2007 | Morris | |
| 2011/0060451 | A1 | 3/2011 | Borowski et al. | |
| 2013/0168300 | A1 * | 7/2013 | Malone | B07C 5/3412 |
| | | | | 209/583 |
| 2014/0343720 | A1 * | 11/2014 | Danelski | B65G 43/08 |
| | | | | 700/225 |

(Continued)

*Primary Examiner* — Thomas Randazzo
(74) *Attorney, Agent, or Firm* — Cesari & Reed LLP; R. Michael Reed

(57) ABSTRACT

In certain embodiments, a system may include an interface configured to couple to a network, at least one optical sensor configured to capture optical data associated with packaging of a waste product, and a processor coupled to the interface and to the at least one optical sensor. The processor may be configured to search at least one data source to automatically identify the waste product based on the optical data and, when the waste product is not automatically identified based on its packaging, send an alert including the optical data to a social media website through the network to solicit identifying information from one or more subscribers.

20 Claims, 11 Drawing Sheets

(56) References Cited

U.S. PATENT DOCUMENTS

2016/0094506 A1\* 3/2016 Harden ................. H04L 51/02
  707/602
2016/0321762 A1\* 11/2016 Schuman ............... G06Q 50/01

\* cited by examiner

WASTE IDENTIFICATION SYSTEMS AND METHODS

CROSS-REFERENCE TO RELATED APPLICATION(S)

This application is a continuation-in-part of and claims priority to co-pending U.S. patent application Ser. No. 14/971,718 filed on Dec. 16, 2015 and entitled "Household Hazardous Waste Recovery", which is incorporated herein by reference in its entirety.

FIELD

The present disclosure is generally related to devices, systems, and methods of waste product identification, and more particularly, to devices systems and methods of identifying household hazardous waste (HHW) products.

BACKGROUND

At a waste disposal facility, waste products may be processed and separated into different categories. Certain types of products, such as chemical products, paint products, and other products (including those that cannot be identified), may sometimes be classified as hazardous waste products, which cannot be disposed of in a landfill. Once classified as hazardous waste, such products are typically burned. For example, this past year, approximately five hundred thirty thousand tons of HHW (e.g., laundry detergent, motor oil, bleach, and the like) were processed at collection facilities. Such items are sufficiently safe that such products can be placed on store shelves, can be sold to consumers without a special permit or license, and can be transported in a standard automobile. However, once such items reach the waste collection facility, such items are typically classified as hazardous and are burned, which process is environmentally questionable and very expensive.

SUMMARY

In certain embodiments, a system may include an interface configured to couple to a network, at least one optical sensor configured to capture optical data associated with packaging of a waste product, and a processor coupled to the interface and to the at least one optical sensor. The processor may be configured to search at least one data source to automatically identify the waste product based on the optical data and, when the waste product is not automatically identified based on its packaging, send an alert including the optical data to a social media website through the network to solicit identifying information from one or more subscribers.

In certain embodiments, a system may include an interface configured to couple to a network and a processor coupled to the interface. The processor may be configured to provide an interface to a first computing device through the network. The interface may include data corresponding to an unidentified waste product and including one or more selectable elements accessible to provide information to identify the unidentified waste product. The processor may be further configured to receive input corresponding to the unidentified waste product from an operator via the interface, apply a time stamp to the input, and selectively send an alert including data corresponding to the input to a computing device through the network.

In still other embodiments, a computer-readable data storage device may store instructions that, when executed, cause a processor to provide an interface to a first computing device through the network. The interface may include data corresponding to an unidentified waste product and including one or more selectable elements accessible to provide information to identify the unidentified waste product. The instructions may further cause the processor to receive input corresponding to the unidentified waste product in response to the interface, apply a time stamp to the input, and send an alert including data corresponding to the input to a second computing device through the network.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of systems, methods, and devices are described below that may be used to intercept HHW products before they are destroyed (through burning or other waste elimination techniques). In certain embodiments, an apparatus includes at least one optical sensor configured to capture optical data associated with the packaging of an HHW product. The apparatus may further include an image processing circuit configured to receive and process the optical data to determine composition information corresponding to the HHW product. The image processing circuit may be configured to determine a barcode from the optical data and to identify the product based on the barcode. Alternatively, the image processing circuit may be configured to compare images of the HHW product to stored images to identify the HHW product based on a correspondence of the optical data to the stored images. Once the HHW product is identified, the apparatus may sort the HHW product into a bin including other HHW products of similar chemical makeup. In certain embodiments, the apparatus may also include a scale to weigh the HHW product.

In some cases, the HHW product may be unidentified by the system. In an example, the product may have marred or damaged packing, or the product may not yet be identified in a database of products. In certain embodiments, the system may be configured to capture optical data corresponding to the HHW product and to generate an alert including at least a portion of the optical data for transmission to a destination device.

In some embodiments, the alert may be sent to a particular user device, such as a device associated with contractor employed to review the alert and to search available data sources to attempt to identify the HHW product. In some embodiments, the alert may be sent to an automated system, which may be configured to utilize artificial or augmented intelligence to automatically search available sources to identify potentially identifying information. In certain embodiments, the retrieved data may be combined with the portion of the optical data and the combined data may be provided to a destination device. In some embodiments, the portion of the optical data and other associated information may be provided to a website, which may host an interface inviting website visitors to assist in identifying the HHW product based on the optical data and the information. The website may offer a reward to a first user to provide verifiable identifying information. Other embodiments are also possible.

Figure 1:
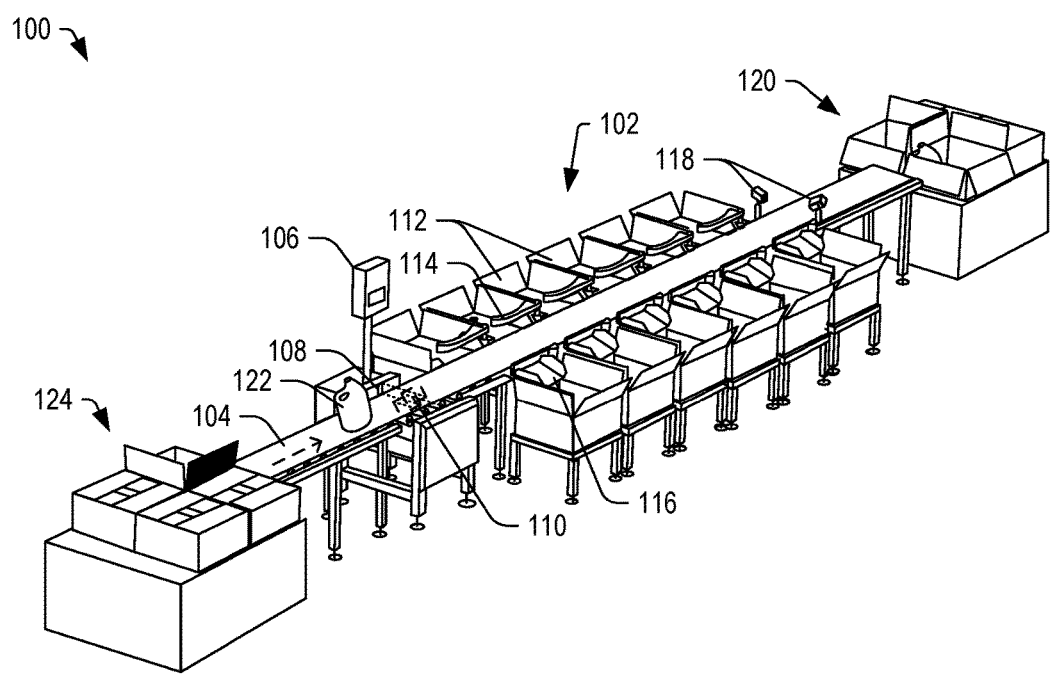
FIG. 1 is a perspective view of a system configured to identify and sort HHW products, in accordance with certain embodiments of the present disclosure.

FIG. 1 is a perspective view of a system 100 configured to identify and sort HHW products, in accordance with certain embodiments of the present disclosure. The system 100 may include a sorting system 102 configured to sort discarded products into an appropriate sorting bin. The system 100 may include a conveyor belt 104 configured to advance HHW products, such as the HHW product 122, past a bar code reader 108 associated with a sorting controller 106, which may optically scan the product using an optical device 108 (such as a bar code scanner, a camera, another type of optical sensor, or any combination thereof). The scan by the optical device 108 is generally indicated at 110. In certain embodiments, an optical device 108 may be provided on either side of the conveyor belt 104.

In certain embodiments, HHW items may be selected from bins 124 and may be placed on the conveyor belt 104. Such placement may be automated (such as by a robotic mechanism) or manual by employees of the waste processing center. The sorting controller 106 may use the bar code data to identify a product, determine a bin 112 into which the product should be routed, and control an actuator arm 114 to extend over the conveyor belt 104 to direct the HHW product 122 into the selected bin 112. Once the HHW product 122 is directed into the selected bin, the sorting controller 106 may send a signal to the actuator arm 114 to cause the actuator arm 114 to return to an initial position or state. Each actuator arm 114 and associated bin 112 may include a slide element 116, which may be a sloped structure configured to ease the delivery of the HHW product 122 into the bin 112.

In certain embodiments, sorting controller 106 may be unable to identify the HHW product 122 based on the optical data, and the sorting controller 106 may cause the conveyor belt 104 to advance the HHW product 122 past one or more optical sensors 118 configured to capture optical data associated with the HHW product 122. The conveyor belt 104 may then deliver the HHW product 122 to a temporary storage bin 120. In the illustrated example, multiple temporary bins 120 are shown.

In certain embodiments, when the sorting controller 106 cannot identify the HHW product (such as when the bar code data may not have been readable by the bar code readers 108 or may have been missing from an HHW product database), the optical data captured by the optical sensors 118 may be used to identify the HHW product 122. The optical data may include images including pictures of the packaging, product name data, bar code data, other data, or any combination thereof. In certain embodiments, a processor of or coupled to the sorting controller 106 may be configured to automatically search for similar shaped containers, product names, product labels, manufacturer names, SKU data, other information, or any combination thereof to identify the product and the corresponding composition of the HHW product. The results of the search may be provided to a destination device. In some embodiments, the results may be presented within a GUI that can be rendered, for example, within an Internet browser application executing on a destination device, allowing the results to be reviewed by an operator, who may selectively accept the retrieved information as identifying the HHW product. In some embodiments, the operator may populate a data record with such information so that subsequent scanning of a similar product will result in correct categorization of the product. Subsequently, the HHW products in the temporary bin 120 may be re-processed using the updated database so that they may be correctly categorized. Other embodiments are also possible.

Figure 2:
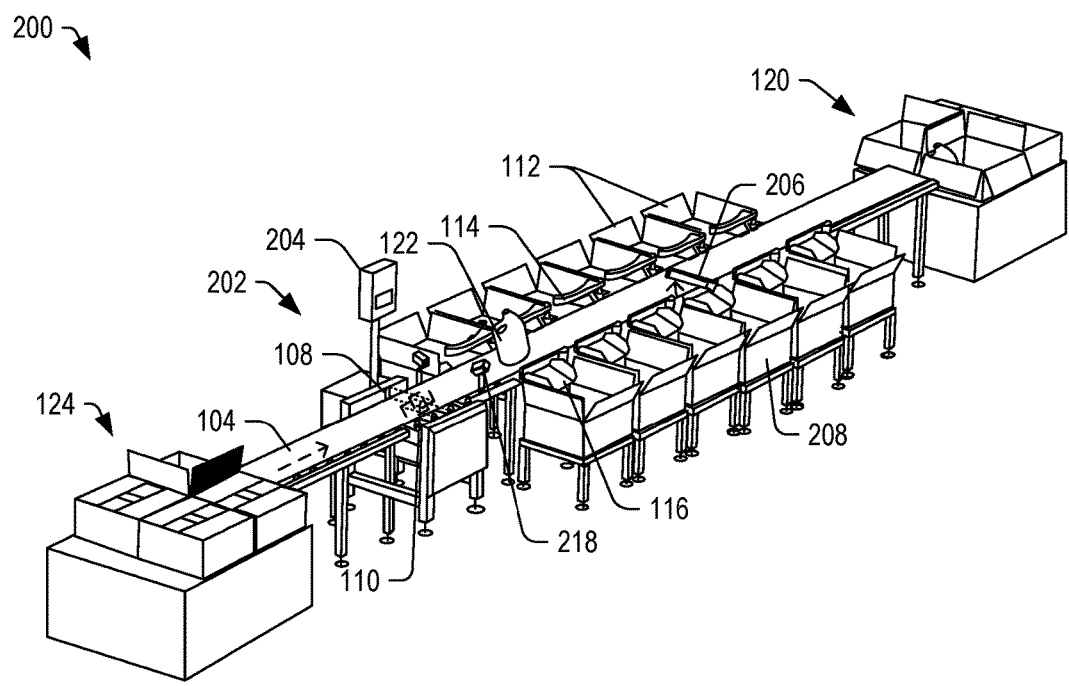
FIG. 2 is a perspective view of a system configured to identify and sort HHW products, in accordance with certain embodiments of the present disclosure.

FIG. 2 is a perspective view of a system 200 configured to identify and sort HHW products, in accordance with certain embodiments of the present disclosure. The system 200 may include all of the elements of the system 100 of FIG. 1, except that the optical sensors 118 are moved to a position that is closer to the sorting controller 106, providing a sorting apparatus 202. In certain embodiments, the sorting controller 106 may include the processing circuitry for searching for product information for unidentified or unrecognized HHW products. In the illustrated example, the sorting controller 204 may include the circuitry of sorting controller 106 as well as circuitry for controlling the optical sensors 218.

In the illustrated example, the HHW product 122 was recognized by the sorting controller 204, which controls the actuator arm 206 to extend over the conveyor belt in order to sweep the HHW product into the bin 208. If the HHW product 122 was not recognized by the sorting controller 204, the sorting controller 204 may control the optical sensors 218 to capture optical data associated with the HHW product 122 before advancing the HHW product into the temporary bin 120. The optical data may then be used to attempt to assemble (automatically or manually) product information corresponding to the HHW product 122.

In one embodiment, the optical sensors 218 may be positioned after a scale in a direction of the movement of the conveyor belt 104. In another embodiment, the optical sensors 218 may be located just before the scale, adjacent to the scale, or at other locations before the conveyor belt 104 or along the path of the conveyor belt 104, depending on the implementation. Other embodiments are also possible.

The examples of FIGS. 1 and 2 depict automated systems that include a conveyor belt 104 and a sorting controller 106 or 204 configured to send control signals to actuator arms 114 to selectively extend or retract a selected one of the actuator arms 114 to direct the HHW product 122. In an alternative embodiment, the sorting may be at least partially manual, and the sorting controller 106 and 204 may illuminate a light or activate another indicator associated with a selected bin to direct a worker to place the HHW product in the selected bin. In another alternative embodiment, instead of a conveyor belt 104, the systems may utilize robotic arms that are configured to perform a pick-and-place type of operation, where the HHW product may be automatically picked up and moved to a scanning location and then picked up and moved to a selected bin. Other embodiments are also possible.

Figure 3:
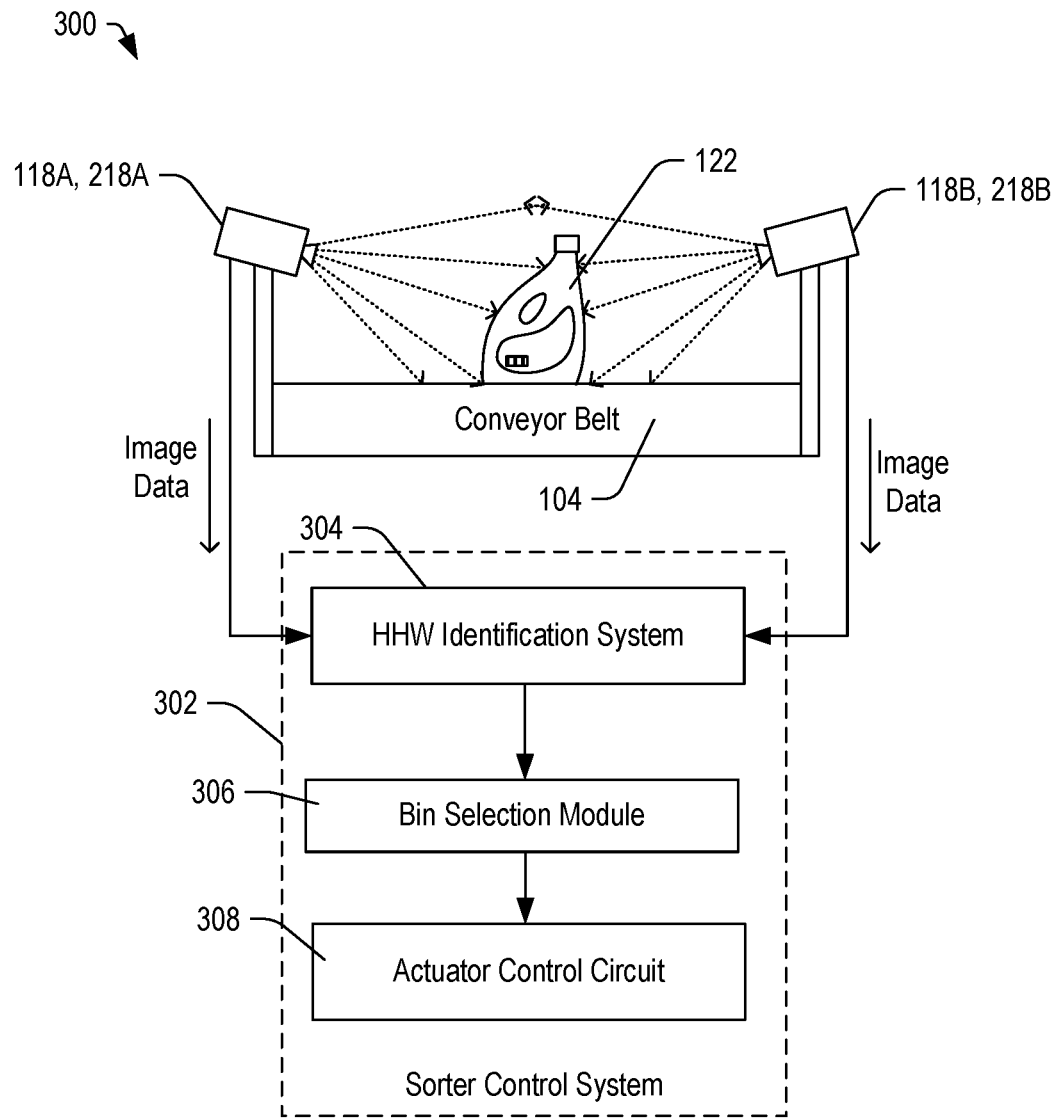
FIG. 3 is a block diagram of a portion of a system configured to identify an HHW product, in accordance with certain embodiments of the present disclosure.

FIG. 3 is a block diagram of a portion 300 of a system configured to identify and sort HHW products, in accordance with certain embodiments of the present disclosure. The portion 300 may be part of the system 100 of FIG. 1 or the system 200 of FIG. 2. The portion 300 includes the optical sensors 118A and 118B or 218A and 218B, for example, which may be positioned adjacent to the conveyor belt 104 to capture optical data associated with the HHW product 122.

The optical sensors 118 or 218 may be coupled to a sorter control system 302, which may include an HHW identification system 304 configured to determine identifying information about the HHW product 122 based on the optical data. The sorter control system 302 may further include a bin selection module 306 configured to determine a suitable bin for an HHW product 122 based on the identifying information. The sorter control system 302 may further include an actuator control circuit 308 configured to control at least one actuator arm 114 to extend across the conveyor belt 104 to sweep the HHW product 122 into the selected bin.

In certain embodiments, the HHW identification system 304 may include optical sensors (bar code readers, cameras, lasers and associated optical sensors, other optical sensors, or any combination thereof). Further, the HHW identification system 304 may include processing circuitry configured to process the optical data and to attempt to identify the HHW product based on the optical data. The processing circuitry may be configured to perform boundary detection operations to detect the edges of an HHW product within the optical data. Further, the processing circuitry may utilize scale invariant feature transform operations to detect and characterize local features in the optical data.

In some embodiments, the HHW identification system 304 may determine feature correspondence between matching or similar images, comparing optical data captured by the cameras 118A, 118B, 218A, or 218B to other available image data. By matching scale invariant features to identify a subset of potential matches and by performing geometric verification on the subset to determine a verified subset, further processing may be performed on the verified subset of data, reducing the processing overhead and enhancing the overall accuracy of the automatic search feature.

In general, images from any given data source may exhibit sparse visual connectivity where only a small fraction of possible images may relate to the scale invariant features of the target image. To avoid exhaustive feature matching on all possible images, the HHW identification system 302 may further reduce the data subset by using whole-image similarity measures, such as bag-of-words (a sparse vector of occurrence counts of a vocabulary of local image features) approach or such as a GIST approach (which summarizes the gradient information (scales and orientations) for different parts of an image to produce a rough description). Either approach may be used to reduce the size of the subset of images on which to perform further processing.

The HHW identification system 304 may include a machine learning component configured to continuously learn during the comparison process and to automatically discover the structure of the image graph. In some examples, bag-of-words approaches may be challenging due to quantization error and imperfect feature detections. As a result, when used to predict image pairs for matching, many cycles may be wasted matching features between non-overlapping images, making the matching process processor and time-intensive.

In some embodiments, the HHW identification system 304 may apply an iterative approach that uses discriminative learning to determine matches. The HHW identification system 304 can adapt and improve the identification process over time, using the results as training data to learn a model specific to a given dataset. Over time, the HHW identification system 304 may become more adept at identifying features within a given image that can be inherently more reliable for measuring image similarity than features. For example, some features may be more stable across different viewpoints, different illuminations, and so on, or may be less sensitive to quantization errors. Further, the system 300 may utilize supervised learning whereby the automatic determination by the HHW identification system 304 can be reviewed and edited by an operator, improving the learning of the HHW identification system 304 over time.

In some embodiments, the HHW identification system 304 may identify one or more features within an input image and may vector-quantize the one or more features according to a vocabulary of features learned from a large data set. The image may then be represented as a histogram over such features. The term frequency and inverse document frequency may be used as a numerical statistic to reflect similarity in a collection of images. Since the HHW identification system 304 attempts to classify images as "matching" or "non-matching", rather than classifying the images into categories, the HHW identification system 304 can use distance metric learning, treating selected elements within images as high-dimensional feature vectors, and determining a distance metric between images based on such elements. Over time, the HHW identification system can learn to classify pairs of images to predict a binary variable representing "matching" or "non-matching" based on such elements.

In some embodiments, the HHW identification system 304 may utilize a hybrid approach configured to selectively switch between detailed image matching and a discriminative model that uses feature analysis to reduce the size of the subset before image matching. Further, in some embodiments, such elements may be selected based on colors, shapes, boundaries, contrast between adjacent pixels, color gradients, other features, or any combination thereof. Other embodiments are also possible.

In some embodiments, the processing circuitry may search the Internet, one or more databases, other data sources, or any combination thereof. In certain embodiments, the processing circuitry may generate a report including optical data (such as images) and other data (such as data appended to the images, data determined from the optical data, or any combination thereof) and may provide the report to one or more operators, a social media website, another site, or any combination thereof. In some embodiments, the system may host a website to encourage consumers to identify such unidentified products, and data collected from the operators, users, consumers, websites, and so on may be used to determine the product composition. Once determined, the information may be presented to an administrator or operator for review and confirmation. If confirmed, the data record for the HHW product may be appended to the database so that subsequent scans may be able to identify the product and the sorter control system 304 may sort the HHW product into the appropriate bin. Further, the subscriber's account may be updated to reflect a successful submission, and the update may include a credit, which may include a cash reward, a gift card, mile points, another type of cash or non-cash scrip, or any combination thereof. Other embodiments are also possible.

Figure 4:
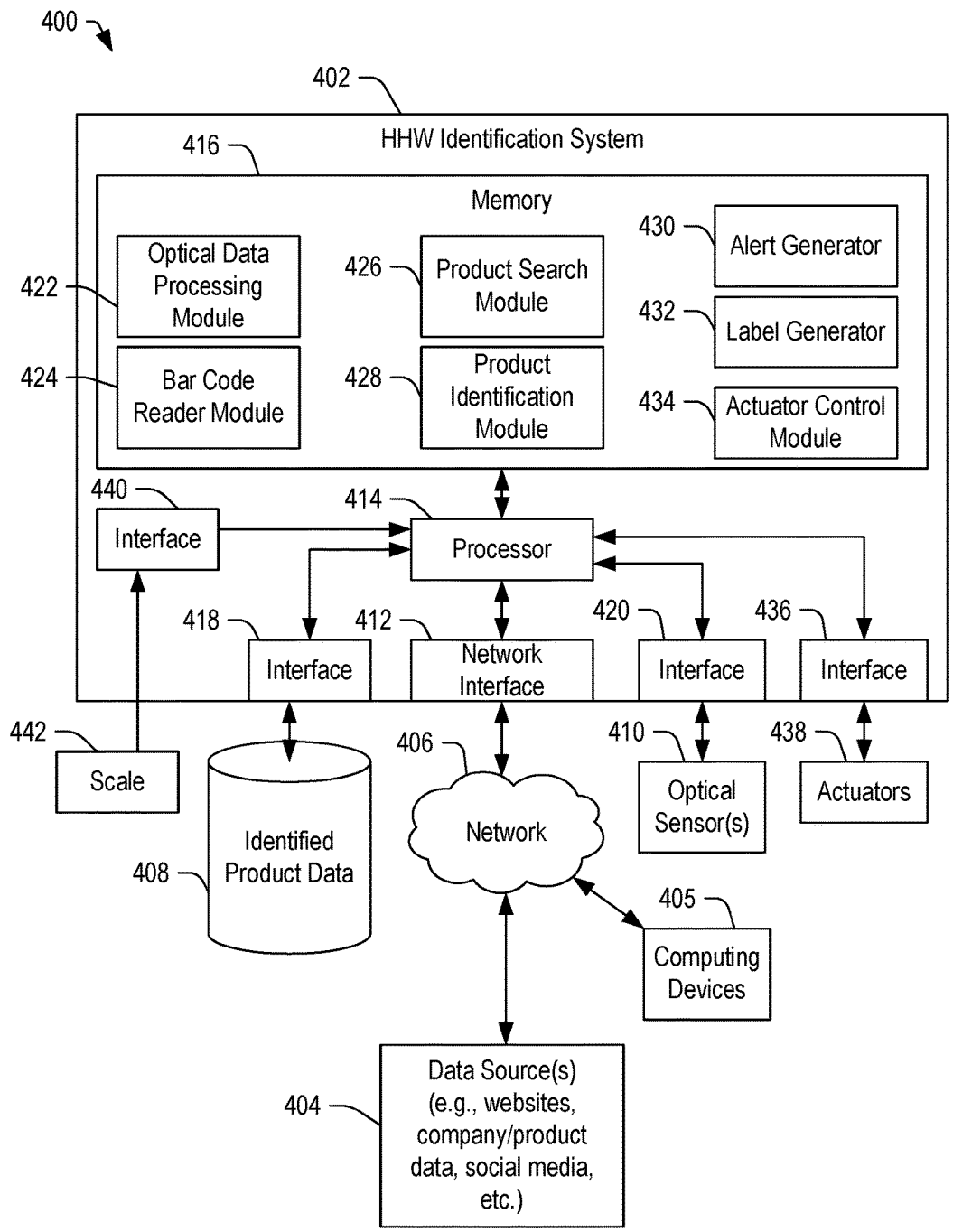
FIG. 4 is a block diagram of a system configured to identify HHW products, in accordance with certain embodiments of the present disclosure.

FIG. 4 is a block diagram of a system 400 configured to identify and sort HHW products, in accordance with certain embodiments of the present disclosure. The system 400 may include elements of the system 100 of FIG. 1, the system 200 of FIG. 2, and the portion 300 of FIG. 3. The system 100 may include an HHW identification system 402 configured to communicate with one or more data sources 404 through a network 406. The data sources 404 may include websites, company data, product data, social media data, other data, or any combination thereof. Further, the HHW identification system 402 may communicate through the network 406 with one or more computing devices 405, a database 408 including identified product data, one or more optical sensors 410, and one or more actuators 438 (or actuator control circuits).

The HHW identification system 402 may include a network interface 412, which may communicate with the network 406, and may include a processor 414 coupled to the network interface 412. Further, the processor 414 may be coupled to the database 408 through an interface 418, to the optical sensors 410 through an interface 420, and to the one or more actuators 438 through an interface 436. The processor 414 may also be coupled to a memory 416, which may store data and processor-readable instructions. The memory 416 may include a hard disc drive, a flash drive, cache memory, optical storage devices (such as compact discs (CDs) and digital video discs (DVDs)), other non-volatile storage devices, or any combination thereof.

The memory 416 may include an optical data processing module 422 that, when executed, may cause the processor 414 to process the optical data, to extract the bar code information, to extract label information (such as a product identifier, a manufacturer, product data, or any combination thereof), to extract image data, or any combination thereof. In some embodiments, the optical data processing module 422 may cause the processor 414 to perform optical character recognition (OCR) on the product label to extract text information from the optical data. The memory 416 may also include a bar code reader module 424 that, when executed, may cause the processor 414 to control one or more bar code readers to scan bar code data associated with packaging of an HHW product. In certain embodiments, the bar code reader module 424 may cause the processor 414 to determine a bar code from bar code data received from the optical data processing module 422.

The memory 416 may further include a product search module 426 that, when executed, may cause the processor 414 to search the database 408 and the one or more data sources 404 based on information determined from the optical data, the bar code data, or any combination thereof. The memory 416 may include a product identification module 428 that, when executed, may cause the processor 414 to identify the HHW product based on the optical data, the bar code data, and retrieved data from the database 408, the data sources 404, or any combination thereof. In certain embodiments, the product identification module 428 may further cause the processor 414 to determine a bin in which to place an identified HHW product so that products having similar chemical compositions may be grouped together.

The memory 416 may also include an alert generator 430 that, when executed, may cause the processor 414 to generate an interface (such as a graphical user interface or GUI), which may include data corresponding to one or more unidentified HHW products, optical data associated with the HHW products, data from the one or more data sources 404, product data from the database 408, other data, or any combination thereof. The alert generator 430 may cause the processor 414 to provide the GUI to a destination device, such as a smart phone, a laptop computer, or another computing device. The destination device may be operated by a user, such as an administrator, an operator, or another type of user. The user may interact with the GUI via the destination device to review the HHW data and to update the record of a selected HHW product. In some embodiments, the alert generator 430 may cause the processor 414 to provide the interface to a server system, which may host a website accessible via the network 406 by a plurality of subscribers. In some embodiments, the website may be a social media website to which users may submit data to identify the selected HHW product.

In certain embodiments, the memory 432 may include a label generator 432 that, when executed, may cause the processor 414 to determine when a bin of a particular HHW product is full (by weight, number of product items, another factor, available bin space, or any combination thereof) and to generate a manifest for a particular bin of HHW products having a similar composition when the bin is full. The memory 416 may also include an actuator control module 434 that, when executed, may cause the processor 414 to provide a control signal to one or more actuators 438 to selectively adjust a rotational position (extended or retracted position) of an actuator arm (such as the actuator arms 114 and 206 in FIGS. 1 and 2, respectively) to direct an HHW product to a selected bin.

In certain embodiments, the product search module 426 and the product identification module 428 may cooperate to cause the processor 414 to automatically attempt to identify the HHW product from the optical data. In certain embodiments, the product search module 426 may search available data sources to identify associated product information. The product identification module 428 may attempt to correlate the product information with the optical data and other data. Further, the product identification module 428 may interact with the report generator 430 to produce an output GUI that may be presented to an operator for verification.

In certain embodiments, the HHW identification system 402 may include an interface 440 coupled to the processor 414. The interface 440 may be coupled to a scale 442, which may be associated with the conveyor system in order to weigh HHW products. In certain embodiments, the processor 414 may correlate the weight to the optical data of an HHW product and the weight may be correlated to an identified product, when the processor 414 can determine the product based on the optical data.

In some embodiments, the product identification module 428 may utilize data determined from the optical data to search various data sources, for example, via the Internet. In some embodiments, the product identification module 428 may interact with one or more web sites to search or to post information about an unidentified HHW product to solicit information from consumers. For example, identifying data may be received from one or more social media websites, which may be in response to a request for information including a report about the HHW product. Some social media participants may find it an interesting challenge to identify such products based on image data, and may provide data that can be used to identify the HHW product. In some embodiments, the challenge may be instituted with a prize to entice users to assist in identifying the HHW product, where the prize may be awarded to the user that provides usable and verifiable information. Other embodiments are also possible.

Figure 5:
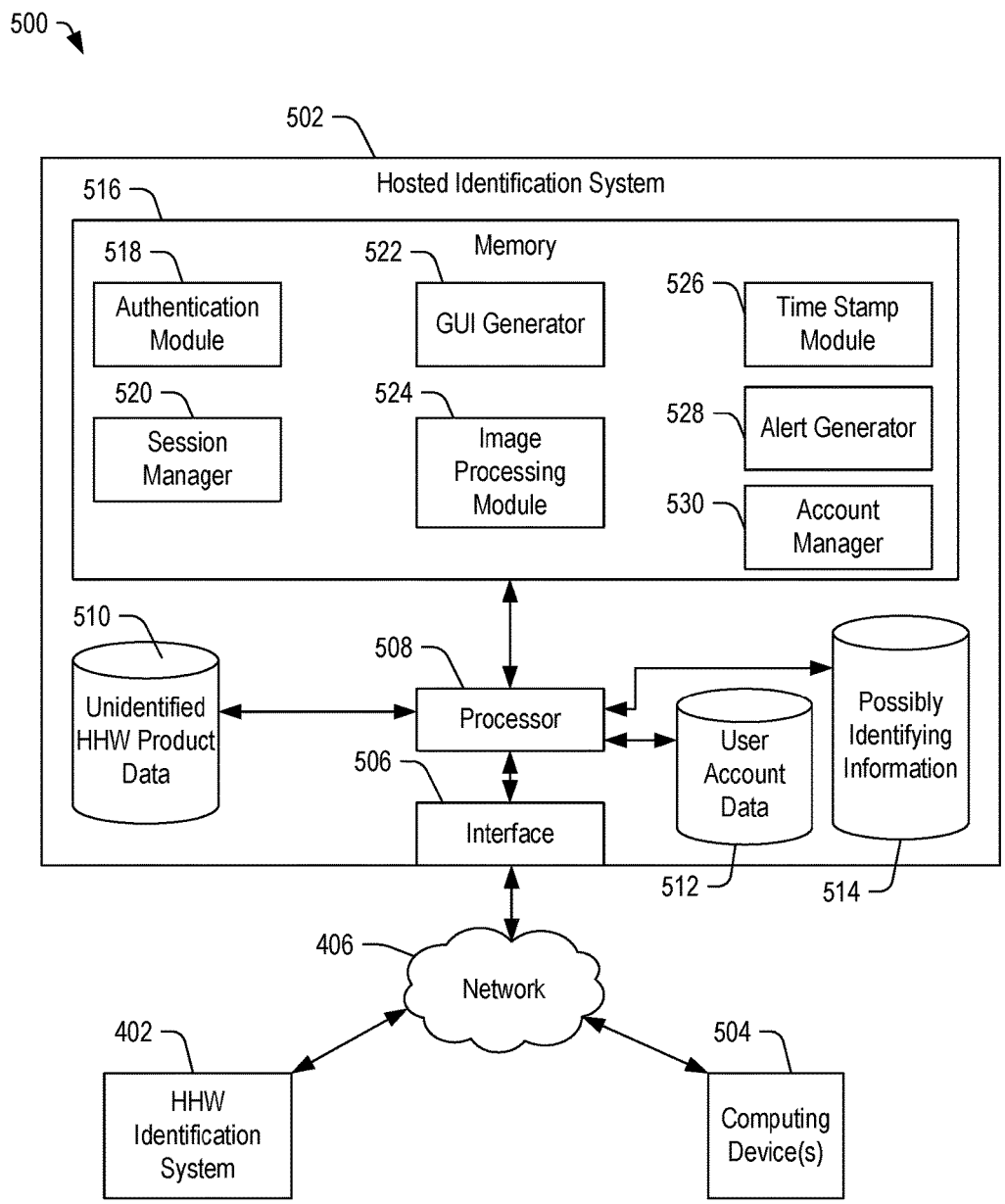
FIG. 5 is a block diagram of a system configured to receive identifying information from one or more data sources, in accordance with certain embodiments of the present disclosure.

FIG. 5 is a block diagram of a system 500 configured to receive identifying information from one or more data sources, in accordance with certain embodiments of the present disclosure. The system 500 may include a hosted identification system 502 configured to communicate with the HHW identification system 402 and one or more computing devices 504 through a network 406. The hosted identification system 502 may be a social media website to which a plurality of users may subscribe. In some embodiments, the hosted identification system 502 may host a website configured to invite subscribers to review information about unidentified HHW products and to provide evidence to identify such products so that the HHW product may be appropriately classified and optionally repurposed.

The hosted identification system 502 may include an interface 506 configured to communicate with the network 406 and may include a processor 508 coupled to the interface 506. The hosted identification system 502 may further include unidentified HHW product data 510, user account data 512, and possibly identifying information 514. Further, the hosted identification system 502 may include a memory 516, which may be configured to store processor-readable instructions and data.

The memory 516 may include an authentication module 518 that, when executed, may cause the processor 508 to authenticate a particular user to the hosted identification system 502 based on data stored in the user account data 512 or to authenticate data received from the HHW identification system 400. The memory 516 may further include a session manager 520 that, when executed, may cause the processor 508 to send and receive data to another device (the computing device 504, the HHW identification system 402, another device, or any combination thereof) and to manage the flow of information between processor 508 and the appropriate device.

The memory 516 may further include a graphical user interface (GUI) generator 522 that, when executed, may cause the processor 508 to generate an interface including data corresponding to at least one item within the unidentified HHW product data 510 and including one or more user-selectable elements accessible by a user to provide data corresponding the item. In an example, a user may interact with the interface to upload text and images in an attempt to identify the item.

The memory 518 may include an image processing module 524 that, when executed, may cause the processor 508 to analyze uploaded images to compare them to images associated with the item in the unidentified HHW product data 510. In an embodiment, the unidentified HHW product data 510 may include images, bar code data, and other information received from the HHW identification system 402 that were captured by the cameras 118 or 218 and that may have been supplemented with further information from the bar code readers or by an operator. The image processing module 524 may utilize the bag-of-words type of analysis, the GIST type of analysis, other image analysis techniques, or any combination thereof to automatically verify submitted images.

The memory 518 may also include a time stamp module 526 that, when executed, may apply a time stamp to information received data and images. The memory 518 may also include an alert generator 528 that, when executed, may cause the processor 508 to provide an alert to an operator to verify the uploaded data. The memory 518 may also include an account manager 530 that, when executed, may cause the processor 508 to associate uploaded data to the user account associated with a particular user in the user account data 512 and to include an identifier within the possibly identifying information 514 together with the time stamp from the time stamp module 526.

In some embodiments, the hosted identification system 502 may receive unidentified HHW product data 510 from the HHW identification system 402. The data may include bar code data, images, text, or any combination thereof. The hosted identification system 502 may store the data in the unidentified HHW product data 510 and may generate an alert to one or more subscribers (or to an operator) using the alert generator 528 to notify the subscribers (or operator) that a new unidentified HHW product is in need of identification.

In certain embodiments, the hosted identification system 502 may provide a web page and associated services, which may be provided in response to a request from a web browser executed by a computing device 504. The web page may include a list of unidentified HHW products or items, and a user may interact with the web page to view the information for a selected HHW product and to provide potentially identifying information corresponding to the selected HHW product. The user may upload one or more images, a text description, one or more links, other information, or any combination thereof.

The hosted identification system 502 may receive the uploaded data from the network 406. The hosted identification system 502 may use the time stamp module 526 to apply a time stamp to the uploaded data before storing the data in the possibly identifying information 514 together with a user identifier corresponding to the user's account in the user account data 512. In some embodiments, the image processing module 524 may be used to compare uploaded image data to image data stored in the unidentified HHW product data 510, such as, for example, the image data associated with the selected HHW product. Further, the hosted identification system 502 may send an alert via the alert generator 528 to an operator to verify the uploaded data.

Once validated by an operator, a credit may be awarded to the user account according to a bounty associated with being the first to identify and provide verifiable evidence supporting the identification of the previously unidentified HHW product. In some embodiments, the credit may be redeemed in the form of a cash payment, a prepaid card, a gift certificate, mile points, other payments, other non-cash scrips, or any combination thereof. In some embodiments, the hosted identification system 502 may generate an alert (using the alert generator 528) to send a notice to a phone or email account of a user who provided the information. The notice may include information about the HHW product, the credit, and options for redeeming the credit. Other embodiments are also possible.

Figure 6:
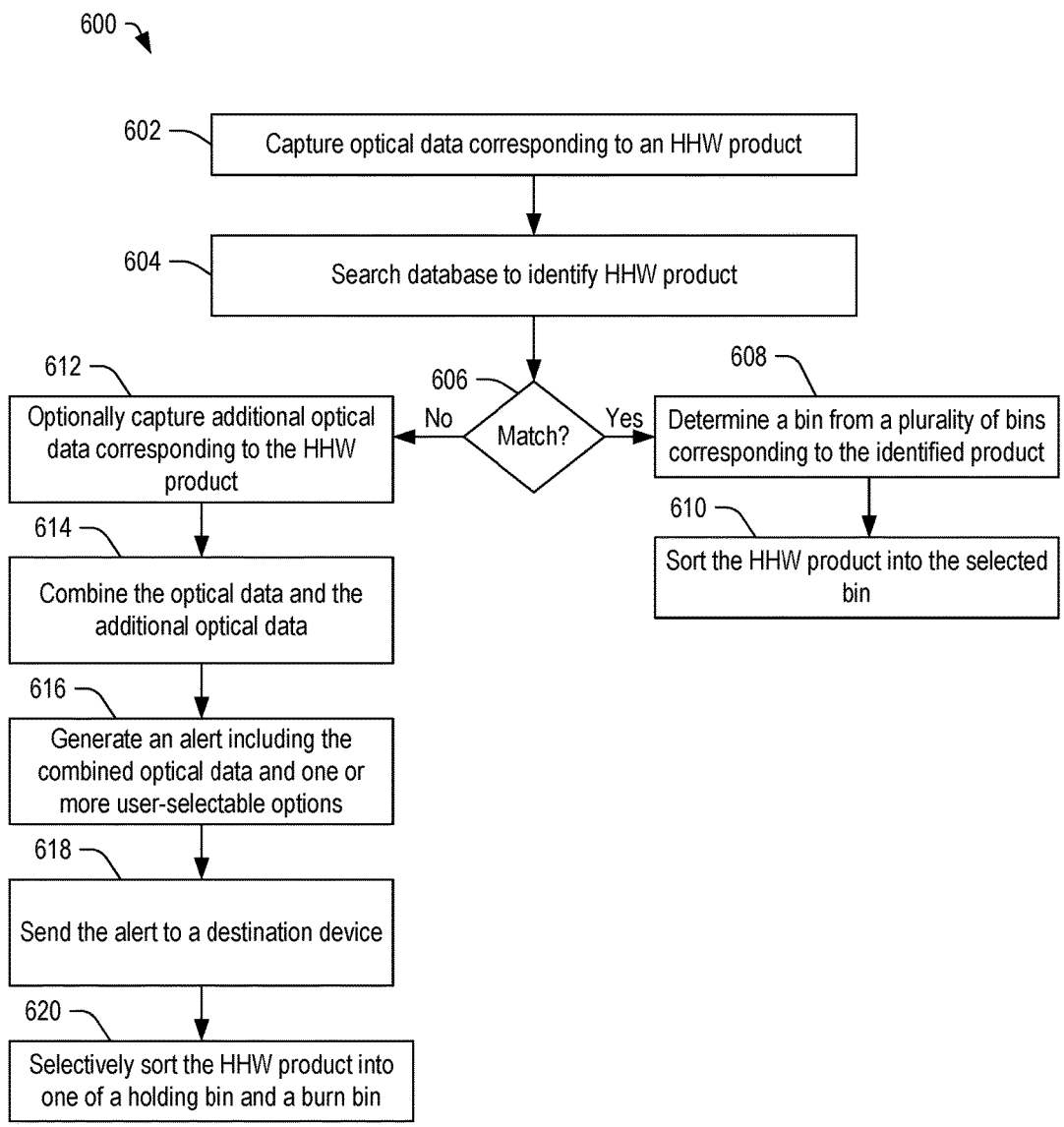
FIG. 6 is a flow diagram of a method of identifying an HHW product, in accordance with certain embodiments of the present disclosure.

FIG. 6 is a flow diagram of a method 600 of identifying an HHW product, in accordance with certain embodiments of the present disclosure. The method 600 may include capturing optical data corresponding to an HHW product, at

602. The optical data may include bar code information, images, or any combination thereof. At 604, the method 600 may include searching a database of images to identify the HHW product based on the optical data.

At 606, if there is a match, at 608, the method 600 includes determining a bin from a plurality of bins corresponding to the identified product. The method 600 may include sorting the HHW product into the selected bin, at 610. In some embodiments, the HHW product may be advanced by a conveyor belt system and may be directed into a selected bin by an actuator arm. In some embodiments, the HHW product may be picked up and placed on a surface for imaging and then manually moved to a selected bin. In such an embodiment, the system may illuminate an indicator above the bin to assist a manual laborer to identify the destination bin. Alternatively, the system may utilize a robotic arm to pick and place the product and the place the identified product into the selected bin.

At 606, if there is no match, the method 600 may include optionally capturing additional optical data corresponding to the HHW product, at 612. In some embodiments, the surface on which the HHW product is positioned may rotate to expose the HHW product to the cameras from a variety of angles. In some embodiments, the cameras may move or multiple cameras may be provided to capture optical data from various angles.

At 614, the method 600 may include combining the optical data and the additional optical data. In some embodiments, the additional data may be appended to the captured optical data. At 616, the method 600 may include generating an alert including the combined optical data and one or more user-selectable options. The alert may include a graphical user interface including buttons, tabs, clickable links, text fields, other selectable elements, or any combination thereof.

At 618, the method 600 may include sending the alert to a destination device. In some embodiments, the destination device may include a computing device associated with a particular user. In other embodiments, the destination device may include an automated system, such as an artificial intelligence-enabled system. In still other embodiments, the destination device may include a hosted identification system, such as the system 502 in FIG. 5. Other embodiments are also possible.

Figure 7:
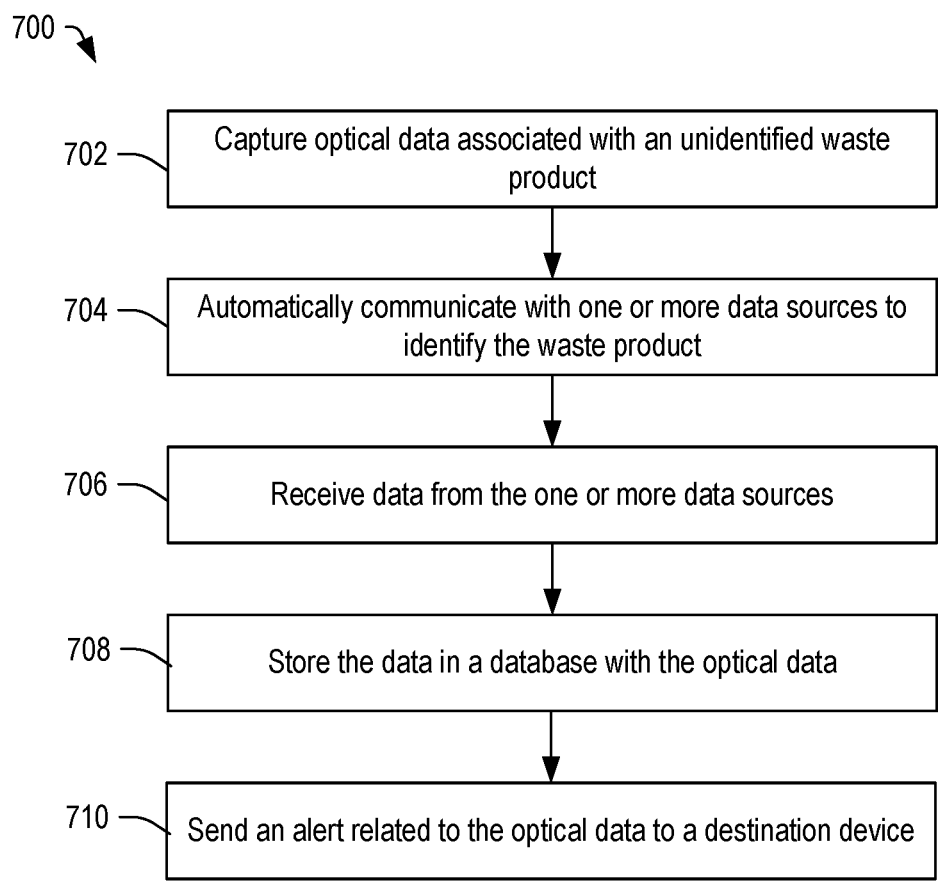
FIG. 7 is a flow diagram of a method of automatically identifying an HHW product, in accordance with certain embodiments of the present disclosure.

FIG. 7 is a flow diagram of a method 700 of automatically identifying an HHW product, in accordance with certain embodiments of the present disclosure. At 702, the method 700 may include capturing optical data associated with an unidentified waste product. In some embodiments, the optical data may include bar code data and one or more images of the product packaging. At 704, the method 700 may include automatically communicating with one or more data sources to identify the waste product. In some embodiments, automatically communicating with data sources may include sending an alert to one or more destination device. In other embodiments, automatically communicating with data sources may include automatic searching of images and data stored by various data sources.

At 706, the method 700 may include receiving data from the one or more data sources. At 708, the method 700 may include storing the data in a database with the optical data. At 710, the method 700 may include sending an alert related to the optical data to a destination device. In some embodiments, the alert may include an interface including optical data, retrieved data, user-selectable elements, or any combination thereof. In an example, the alert may be sent to an HHW identification system, such as the system 502 in FIG. 5. In another example, the alert may be sent to a computing device, which may be associated with an operator. The alert may include an invitation to provide identifying information, to edit the record associated with the unidentified HHW product, or other information. Other embodiments are also possible.

Figure 8:
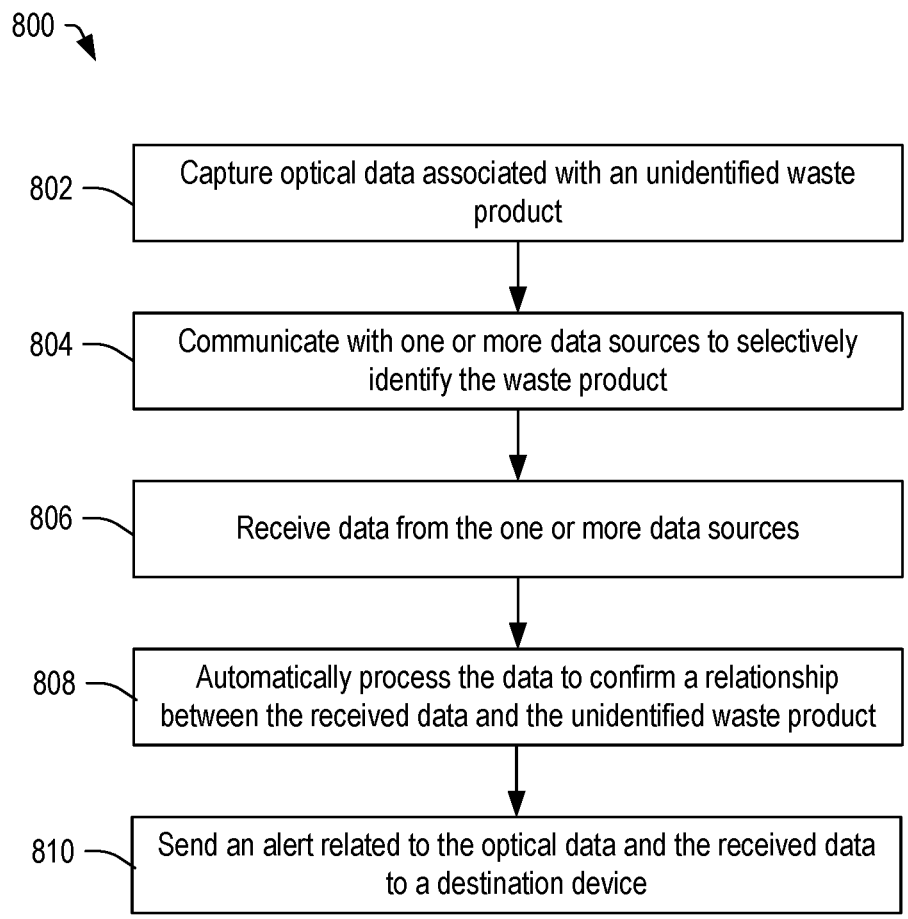
FIG. 8 is a flow diagram of a method of selectively sorting an HHW product based on image data, in accordance with certain embodiments of the present disclosure.

FIG. 8 is a flow diagram of a method 800 of selectively sorting an HHW product based on image data, in accordance with certain embodiments of the present disclosure. At 802, the method 800 may include capturing optical data associated with an unidentified waste product. In a particular example, optical sensors may capture multiple pictures of the product packaging. At 804, the method 800 may include communicating with one or more data sources to selectively identify the waste product. The one or more data sources may include web sites, databases, and computing devices associated with a particular user or operator. The one or more data sources may also include an HHW identification system, such as the system 502 in FIG. 5.

At 806, the method 800 may include receiving data from the one or more data sources. At 808, the method 800 may also include automatically processing the data to confirm a relationship between the received data and the unidentified waste product. In an example, the system may perform image processing operations on the received data relative to images of the unidentified product to determine if there is sufficient correspondence to suggest identification of the unidentified product. In an example, the system may attempt to verify correspondence between several aspects, including dimensions (if possible), shape, labeling, and so on. In some embodiments, if the packaging, size and shape are not sufficiently similar (for example, approximately less than 75% correspondence), the received data may be stored but may be rejected as a possible identifying match for the particular waste product. In another embodiment, the system may automatically compare data associated with the input to data corresponding to the unidentified waste product to determine a number of corresponding elements and send an alert when the number of corresponding elements exceeds a predetermined threshold. Data that has a higher than a threshold correspondence may be provided (for example, by sending an alert) to an operator for further verification.

At 810, the method 800 may include sending an alert related to the optical data and the received data to a destination device. In some embodiments, multiple alerts may be sent providing such information in the time order that it was received. The alert may be sent to a computing device associated with an administrator or an operator to confirm correspondence in order to determine if the unidentified waste product has been positively identified. If the identifying data is sufficient to identify the waste product, the operator may confirm the data by interacting with an interface or otherwise confirming the correspondence.

In some embodiments, the confirmation may cause the HHW identification system 502 in FIG. 5 to associate the potentially identifying information with the particular HHW product and to send data related to the match to the HHW identification system 402 in FIG. 4 to update the identified product data 408. Further, the confirmation may cause the HHW identification system 502 in FIG. 5 to update the user account data 512 and to award credits to the user for being the first to submit verifiable identifying data for the previously unidentified HHW product.

Figure 9:
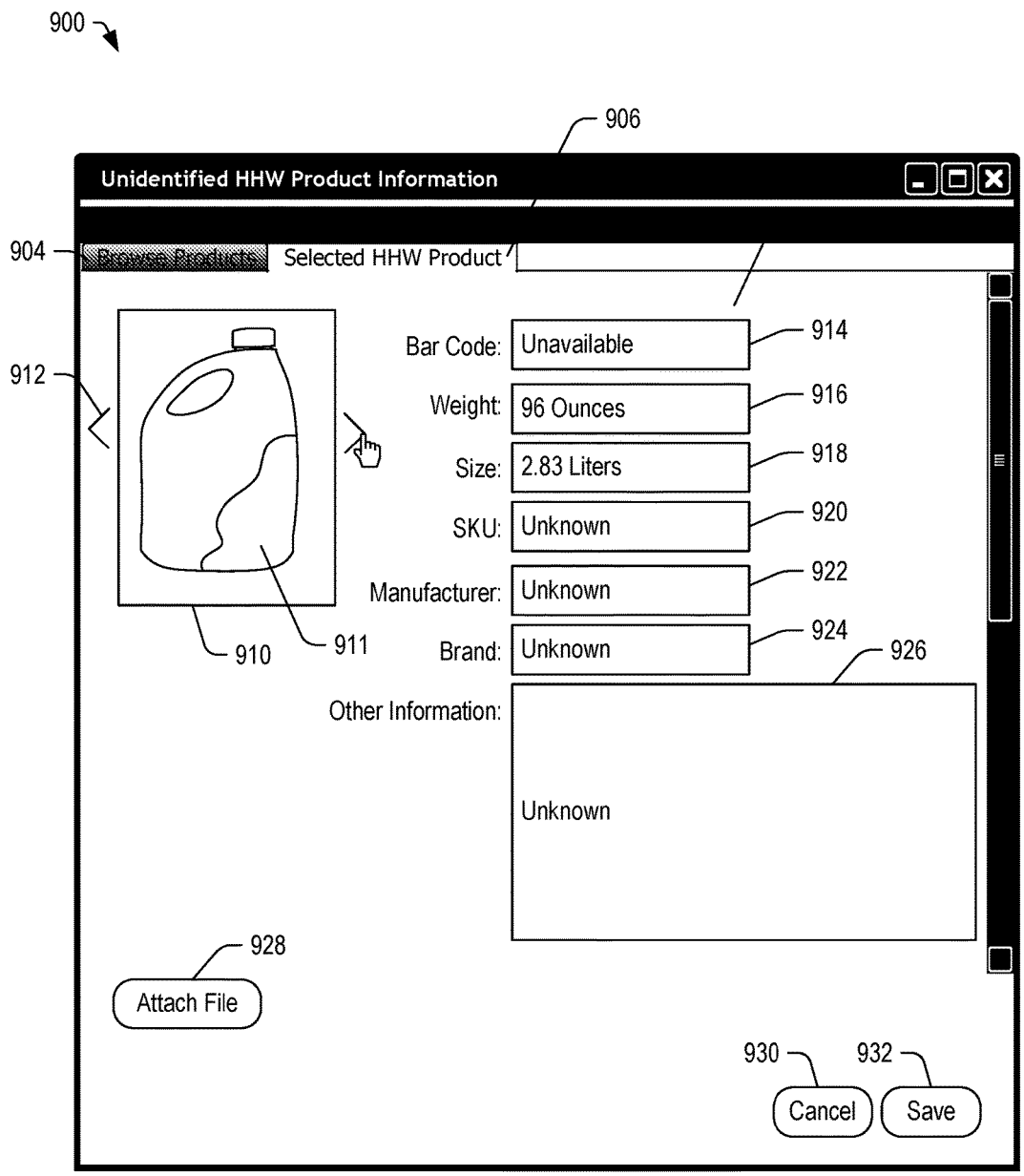
FIG. 9 is a diagram of an interface for identifying an unknown HHW product, in accordance with certain embodiments of the present disclosure.

FIG. 9 is a diagram of an interface 900 for identifying an unknown HHW product, in accordance with certain embodiments of the present disclosure. The interface 900 may include one or more user-selectable options, including tabs 904 and 906, navigation arrows 912, text fields, 914, 916, 918, 920, 922, 924, and 926, and buttons 928, 930, and 932. Other user-selectable options may include menus, clickable links, checkboxes, radio buttons, sliders, other elements, or any combination thereof.

The interface 900 includes a "Browse Products" tab 904, which may be selected by an operator to view a list of unidentified HHW products, for example. The operator may browse the list, which may include text, images, or any combination thereof. The operator may select one of the items from the list, and data associated with the selected item may be shown in a "Selected HHW Product" tab 906, which has an associated HHW product panel 908. The HHW product panel 908 includes at least one image 910 of the HHW product and navigation arrows 912 to switch between views if multiple views of the product packaging are available.

The HHW product panel 908 may also include information determined from the product packaging. For example, in some embodiments, the product label 911 may be torn, scratched, or otherwise damaged or marked in such a way as to interfere with product identification. Some data, however, may be recovered from undamaged areas of the label. In the illustrated example, the bar code 914 may be unavailable, but the weight 916 and the size 918 of the container may be determined from the product label. The product SKU 920, the manufacturer 922, and the brand 924 may also be illegible. Further, there may or may not be other information, such as the type of product (e.g., bleach, laundry detergent, floor cleaner, etc.). The operator may interact with the interface 902 to provide the missing data. Further, the operator may upload one or more documents or images by selecting the "Attach file" button and browsing to locate and select the one or more files (documents, images, or any combination thereof). The operator may also cancel any changes by selecting the "Cancel" button 930 or may save the changes by selecting the "Save" button 932.

Figure 10:
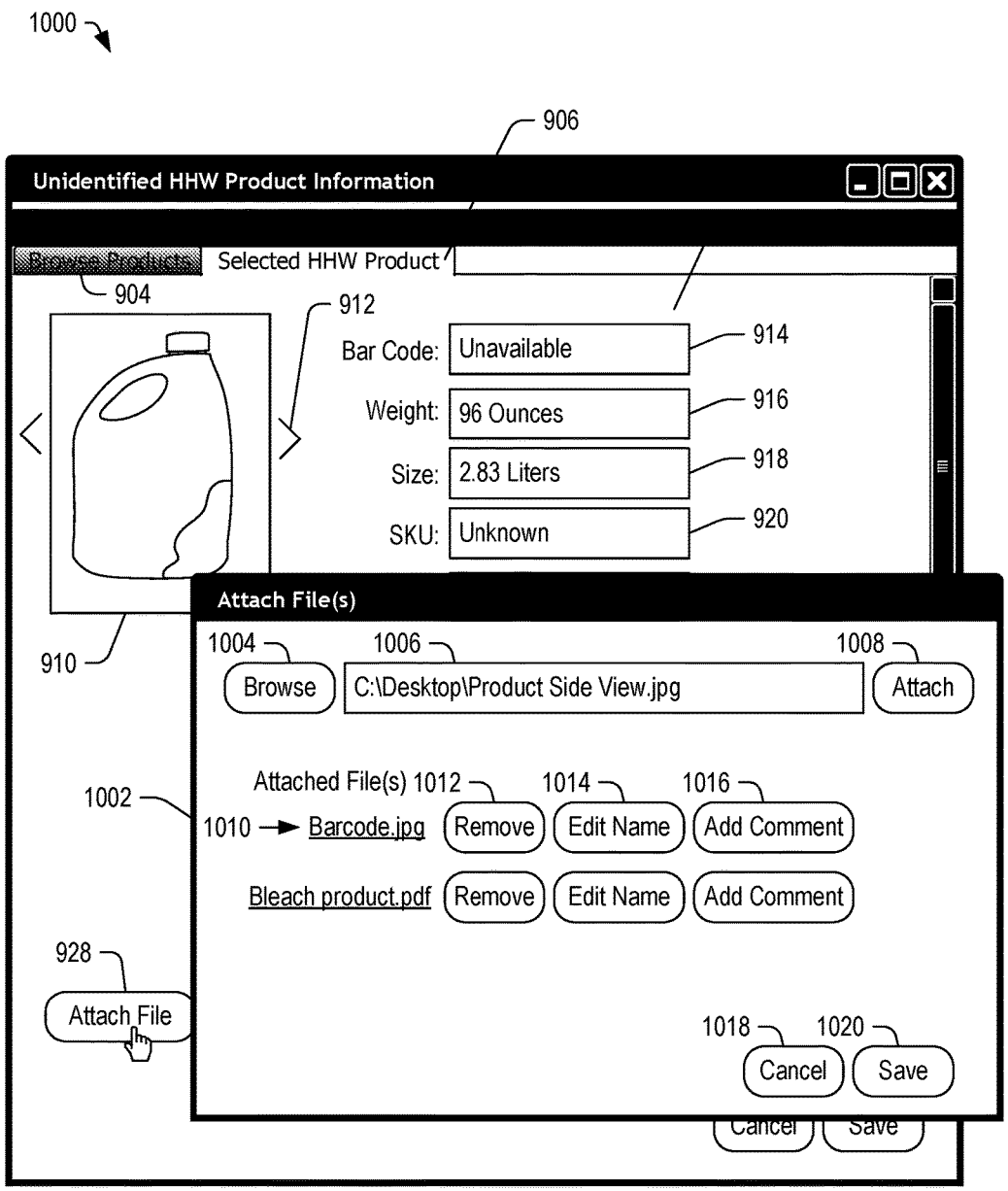
FIG. 10 is a diagram of an interface for identifying an unknown HHW product including a popup window to attach evidence, in accordance with certain embodiments of the present disclosure.

FIG. 10 is a diagram of an interface 1000 for identifying an unknown HHW product including a popup window to attach evidence, in accordance with certain embodiments of the present disclosure. The interface 1000 includes all of the elements of the interface 900 in FIG. 9. The operator may have selected the "Attach File" button 928 causing the interface 1000 to provide a pop up window 1002 including a "Browse" button 1004 and a text input 1006 for selecting a file to be attached. Once selected, the operator may select the "Attach" button 1008.

In the illustrated example, the operator may have already attached a barcode image labeled "Barcode.jpg" and generally indicated at 1010. Each attached file may have associated buttons for removing, editing the name, or adding a comment to an uploaded file. In the illustrated example, the barcode image has a "Remove" button 1012, an "Edit Name" button 1014, and an "Add Comment" button 1016. If the operator selects the "Add Comment" button 1016, an additional popup window may be provided or a text field may be added to the existing popup window 1002 to receive text input from the operator. In the illustrated example, the text field 1006 shows the operator in process of uploading an image file, but other types of files may also be uploaded, including text files, portable document format (PDF) files, portable network graphic (PNG) files, joint photographic expert group (JPG) files, other formats, or any combination thereof.

Once the operator is finished providing documentation, the operator may select the "Save" button 1020 to upload the data. Otherwise, the operator may select the "Cancel" button 1018 to return to the interface 1000. Other embodiments are also possible.

Once the data is uploaded, the interface 1000 may be updated with a list of the uploaded documents for review. The operator may then interact with the "Save" button 932 to save the uploaded files to the system. By saving the uploaded files, the user submits the files and the associated data as documentation identifying the product, which identification may then be verified by another operator.

Figure 11:
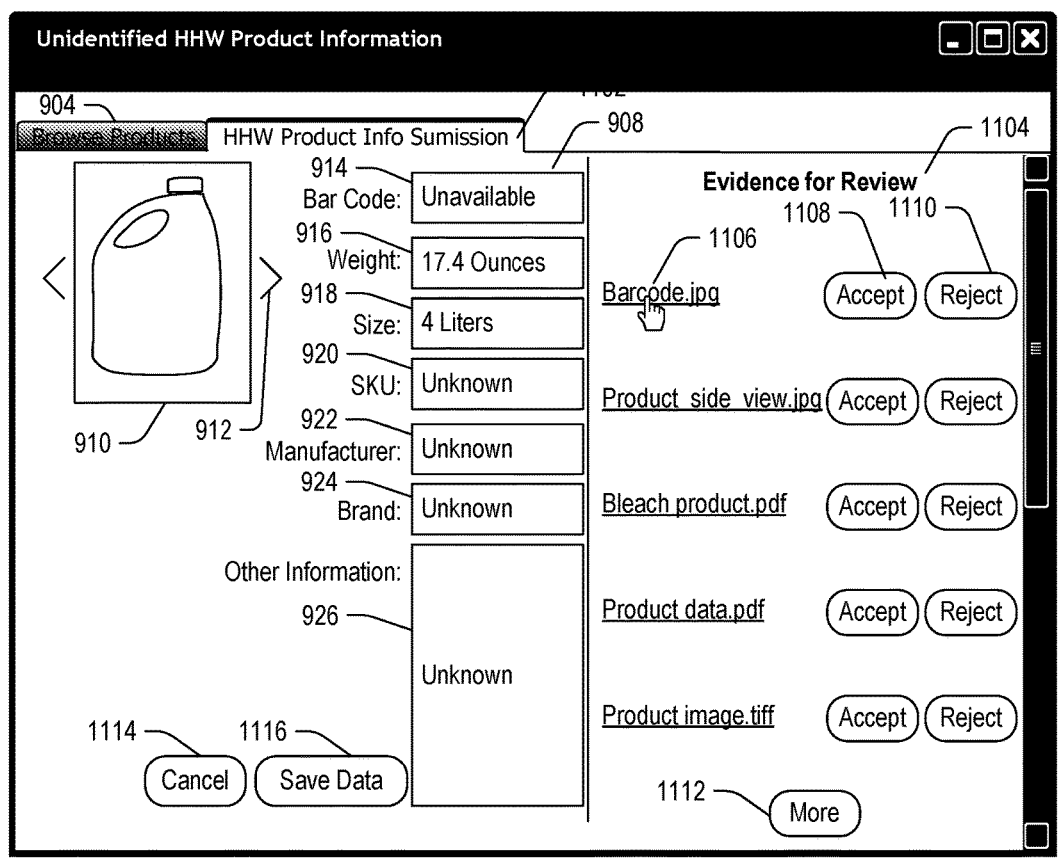
FIG. 11 is a diagram of an interface for identifying an unknown HHW product including a review panel, in accordance with certain embodiments of the present disclosure.

FIG. 11 is a diagram of an interface 1100 for identifying an unknown HHW product including a review panel, in accordance with certain embodiments of the present disclosure. The interface 1100 may be presented to an authorized operator for evaluating submitted evidence to determine if the evidence is sufficient to identify the HHW product shown in the image 910. The interface 1100 includes all of the elements of the interface 900 of FIG. 9. Further, the interface 1100 replaced the tab 906 with an "HHW Product Info Submission" tab 1102. Further, the interface 1100 includes an additional "Evidence for Review" panel 1104.

In the illustrated example, the "Evidence for Review" panel 1104 may include a list of evidence 1106, presented as clickable links so that the operator may select and review the evidence. In the illustrated example, the evidence may include a "Barcode.jpg" file, a "Product side view.jpg" file, a "Bleach product.pdf" file, a "Product data.pdf" file, and a "Product image.tiff" file. The "Evidence for Review" panel 1104 may include more evidence, accessible by selecting the "More" button. Each item of evidence may also be associated with an "Accept" button 1108 and a "Reject" button 1110, which may be selected to either reject or approve the submitted file as evidence. Thus, an operator may review the submitted file relative to the HHW product information in the panel 908 to determine whether it is a match. Once completed, the operator may select the "Save Data" button 1116 to store the results of the review.

In conjunction with the systems, methods, devices, and GUIs described above with respect to FIGS. 1-11, some HHW products may be intercepted and repurposed or redirected from an expensive burning disposal process to another use or another process. In certain embodiments, optical sensors may capture optical data associated with an HHW product, and the optical data may be processed to identify information about the HHW product. In certain embodiments, the optical data may be automatically processed against potentially identifying information to identify the product. Further, in some embodiments, the optical data may be processed by an operator to determine the identity of the HHW product. In certain embodiments, the optical data may be presented in a GUI to a website, such as a social media website, which may offer a bounty to pay for information leading to identification of the HHW product. Users may interact with the website to provide identifying information. The system may time stamp the received information so that the first to provide verifiably identifying information may be rewarded. The system or an operator may verify the identifying information, and the first to provide such information may be rewarded with credits in the form of cash, credit, or non-cash reward points. Other embodiments are also possible.

The processes, machines, and manufactures (and improvements thereof) described herein are particularly useful improvements for processing household hazardous waste products. Further, the embodiments and examples herein provide improvements in the technology of HHW sorting systems. In addition, embodiments and examples herein provide improvements to the functioning of a waste sorting system by processing optical data associated with unknown or unidentified products to identify HHW products so that product information can be determined, such as the HHW product's chemical composition, thereby creating a specific purpose computing device by adding such technology. Thus, the improvements herein provide for technical advantages, such as providing a system in which HHW products can be identified based on optical data and can be diverted from burning and optionally repurposed or sold. In certain embodiments, the identified products can be diverted to a less expensive disposal option as compared to burning. While technical fields, descriptions, improvements, and advantages are discussed herein, these are not exhaustive and the embodiments and examples provided herein can apply to other technical fields, can provide further technical advantages, can provide for improvements to other technologies, and can provide other benefits to technology. Further, each of the embodiments and examples may include any one or more improvements, benefits and advantages presented herein.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments, blocks may be removed or combined without departing from the scope of the disclosure. Further, structural and functional elements within the diagram may be combined, in certain embodiments, without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
an interface configured to couple to a network;
at least one optical sensor configured to capture optical data associated with packaging of a waste product; and
a processor coupled to the interface and to the at least one optical sensor, the processor configured to:
search at least one data source to automatically identify the waste product based on the optical data; and
when the waste product is not automatically identified based on its packaging, send an alert including the optical data to a social media website through the network to solicit identifying information from one or more sub scribers.

2. The system of claim 1, wherein the processor is configured to automatically send the alert.

3. The system of claim 1, wherein the processor is configured to:
provide an interface including the optical data and one or more user-selectable options to a computing device associated with an operator;
receive a selection corresponding to one or more of the user-selectable options from the computing device; and
send the alert in response to receiving the selection.

4. The system of claim 1, wherein the alert further includes one or more user-selectable options accessible by a user to provide data corresponding to the waste product.

5. The system of claim 1, wherein the processor is further configured to:
receive potentially identifying information corresponding to the waste product; and
provide an alert to a computing device associated with an operator to verify if the potentially identifying information matches the waste product.

6. The system of claim 1, wherein the processor is further configured to:
receive verified identifying information corresponding to the waste product; and
update a database to include identifying information for the waste product.

7. A system comprising:
an interface configured to couple to a network; and
a processor coupled to the interface and configured to:
provide an interface to a first computing device through the network, the interface including data corresponding to an unidentified waste product and including one or more selectable elements accessible to provide information to identify the unidentified waste product;
receive input corresponding to the unidentified waste product from an operator via the interface;
apply a time stamp to the input; and
send an alert including data corresponding to the input to a second computing device through the network.

8. The system of claim 7, further comprising storing data corresponding to the input in a memory.

9. The system of claim 7, wherein, before sending the alert, the processor is configured to:
automatically compare data associated with the input to data corresponding to the unidentified waste product to determine a number of corresponding elements; and
send the alert when the number of corresponding elements exceeds a predetermined threshold.

10. The system of claim 9, wherein the processor is further configured to:
receive a validation of the data associated with the input from the second computing device;
update the data corresponding to the unidentified waste product to indicate identification in response to receiving the validation; and
send data including the data associated with the input to a household hazardous waste (HHW) product identification system.

11. The system of claim 10, wherein the processor is further configured to update a user account associated with the operator associated with the input to credit the user account.

12. The system of claim 10, wherein the processor is further configured to:
receive a rejection of the data associated with the input from the second computing device;

update a user account corresponding to the operator in response to receiving the rejection.

13. The system of claim 7, wherein the processor is further configured to:
receive the data corresponding to the unidentified waste product from a household hazardous waste (HHW) product identification system; and
store the data in a database configured to store information including images of a plurality of unidentified waste products.

14. The system of claim 7, wherein the processor is further configured to:
provide a login interface to the computing device;
receive login data corresponding to a user account in response to the login interface;
authenticate the login data against user account data; and
when the login data is authenticated, provide the interface including the data corresponding to the unidentified waste product.

15. A computer-readable data storage device storing instructions that, when executed, cause a processor to:
provide an interface to a first computing device through the network, the interface including data corresponding to an unidentified waste product and including one or more selectable elements accessible to provide information to identify the unidentified waste product;
receive input corresponding to the unidentified waste product in response to the interface;
apply a time stamp to the input; and
send an alert including data corresponding to the input to a second computing device through the network.

16. The computer-readable data storage device of claim 15, further including instructions that, when executed, cause the processor to:
automatically compare data associated with the input to data corresponding to the unidentified waste product to determine a number of corresponding elements; and
send the alert when the number of corresponding elements exceeds a predetermined threshold.

17. The computer-readable data storage device of claim 16, wherein the processor is further configured to:
receive a validation of the data associated with the input from the second computing device;
update the data corresponding to the unidentified waste product to indicate identification in response to receiving the validation; and
send data including the data associated with the input to a household hazardous waste (HHW) product identification system.

18. The computer-readable data storage device of claim 17, wherein the processor is further configured to update a user account associated with the operator associated with the input to credit the user account.

19. The computer-readable data storage device of claim 17, wherein the processor is further configured to:
receive a rejection of the data associated with the input from the second computing device;
update a user account corresponding to the operator in response to receiving the rejection.

20. The computer-readable data storage device of claim 15, wherein the processor is further configured to:
receive the data corresponding to the unidentified waste product from a household hazardous waste (HHW) product identification system; and
store the data in a database configured to store information including images of a plurality of unidentified waste products.

* * * * *